CONTAINER

Filed Dec. 2, 1957 3 Sheets-Sheet 1

INVENTOR:
WALTER C. GEORGE
By William Nye
ATTORNEY

Aug. 29, 1961

W. C. GEORGE 2,998,182

CONTAINER

Filed Dec. 2, 1957

3 Sheets-Sheet 2

INVENTOR
WALTER C. GEORGE
BY William [signature]
ATTORNEY

Aug. 29, 1961 W. C. GEORGE 2,998,182

CONTAINER

Filed Dec. 2, 1957 3 Sheets-Sheet 3

INVENTOR:
WALTER C. GEORGE
BY William Nye
ATTORNEY

United States Patent Office 2,998,182

Patented Aug. 29, 1961

2,998,182
CONTAINER

Walter C. George, St. Louis, Mo., assignor to Crown Zellerbach Corporation, San Francisco, Calif., a corporation of Nevada Filed Dec. 2, 1957, Ser. No. 700,225
1 Claim. (Cl. 229—65)

This application is a continuation-in-part of Serial No. 684,011 entitled "Asphalt Drum Closure," filed September 16, 1957, now abandoned.

More specifically the invention relates to a novel bottom closure for a tall open drum or bag like container which is proof against leakage when the drum is filled with asphalt at an elevated temperature in a liquid state and thereafter cooled to a solid state, whereby the drum may be readily handled, stored or shipped to the point of use and the drum cleanly stripped from the asphalt.

The container is relatively tall, open and initially square in shape and is formed from a single sheet of paperboard. The sheet is joined together by a vertically disposed manufacturer's joint preferably midway the width of one wall of one pair of opposed walls, the other pair of opposed walls are scored along their median width, whereby the connected together walls may be collapsed along the median width of one pair of opposed walls. Relatively narrow free margins of the lower ends of all of the walls are secured together in lengthwise juxtaposed relation. Specifically the juxtaposed lower margins of the walls may take the form of a "fin" joint which may be enclosed from end to end in a strip of tape, or other suitable closure means, forming a liquid proof seal.

A horizontal score extends across the lower margins of all of the wall panels positioned above the fin joint a distance equal to substantially one half the width of a side wall, defining a body portion and a closure portion of the blank. The lower margins of one pair of opposed side walls thus defined which, when extended inwardly, form the inner bottom of the closure portion and the lower margins of the other opposed pair of walls form integral sections of the closure portion which are diagonally scored to form outwardly extending two ply triangular bellows folds. Upon opening the collapsed structure into square form, the juxtaposed free margins of the lower ends of the walls, or fin joint extends upright across the bottom of the container to the ends of the extended triangular integral sections of the closure portion.

The fin joint is then folded flatwise against the inner bottom closure and the triangular sections are folded right angularly inwardly and the end abutting margins of the fin joint are secured by a staple or other suitable means to the subjacent portion of the flat fin joint and to the closure portion if desired, completing the leak proof closure of the container.

An object of the invention is to provide a square bottom closure for a relatively tall open container having two pairs of opposed walls, the closure comprising a fin joint secured from end to end of the juxtaposed free end margins of the container walls and a section of each wall extending from the fin joint upwardly a distance equal to one half the width of a wall panel. The sections of one pair of opposed walls form an inner flat bottom of the closure, the sections of the other pair of walls are diagonally scored and folded to form two ply triangular sections with the apices thereof in substantially abutting relation over the sections of the first mentioned pair of opposed walls with the fin joint interposed therebetween. The exposed end portions of the fin joint are secured to the exposed subjacent portions including the closure portion if desired.

A further object of the invention is to provide an effective bottom closure for a tall rectangular container for retaining asphalt and other bituminous materials at elevated temperatures in molten state, the closure comprising a fin joint of the lower margins of one end of the container preferably enclosed with a tape, or other suitable means, and lower sections of one pair of opposed walls folded right angularly inwardly forming an inner bottom and lower sections of the other pair of opposed walls forming two ply triangular portions folded right angularly inwardly over the first mentioned sections with the fin joint interposed therebetween.

A still further object of the invention is to provide an effective bottom closure for a relatively tall square container for retaining asphalt and other bituminous materials at an elevated temperature in a molten state, the closure comprising a fin joint of relatively narrow bottom juxtaposed end margins of the walls of the container and transverse sections of each wall equal to one half the width of the walls, the sections being positioned immediately above the fin joint, the sections of one pair of walls being folded right angularly inwardly forming an inner bottom, the sections of the other pair of opposed walls being scored diagonally to initially form, in the opened form of the body of the container, outwardly projecting two ply triangular folds with the fin joint extending right angularly upwardly across the said inner bottom and the outwardly extending triangular folds. In the fully assembled position of the container the triangular folds are folded flatwise over the inner closure bottom with the fin joint interposed and with the apices thereof in substantially abutting relation with the opposed ends of the fin joint secured by a staple or other suitable means to the subjacent portion of the fin joint, completing the bottom closure.

Another object is to provide a relatively tall container of two pair of opposed side walls with a square leakproof bottom closure for packaging asphalt in molten state at elevated temperatures, the walls of the container, when filled with the asphalt, becoming substantially circular a short distance above the square bottom closure, thereby promoting intentional rolling of the container and preventing accidental rolling.

The invention also consists in the parts and in the arrangements and combination of parts hereinafter described and claimed. The accompanying drawings which form a part of the specification and wherein like numerals and symbols refer to like parts wherever they occur.

Figures 1, 2, 3, 4, 5, 6, 7, 8:
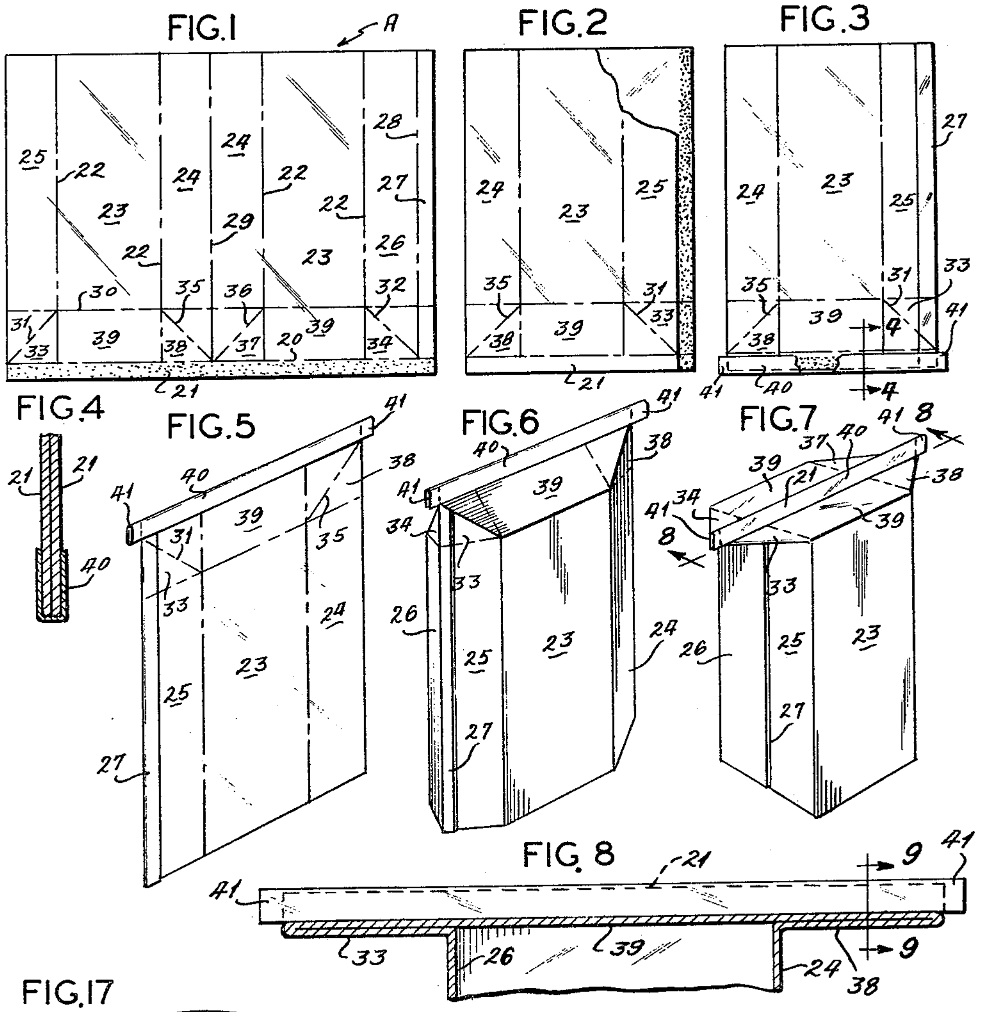
FIG. 1 is a plan view of a paperboard blank scored to define a body portion and a closure portion with integral sections, a vertical sealing strip and a bottom fin joint strip.
FIG. 2 is a plan view of the blank of FIG. 1 folded preparatory to attaching the vertical sealing strip to the side edge of the remote side wall and with the halves of the horizontal fin joint folded over in juxtaposed relation.
FIG. 3 is a plan view showing the connected together blank of FIG. 2 with the juxtaposed halves of the horizontal strip enclosed with a sealing tape.
FIG. 4 is a sectional view of FIG. 3 taken in the direction of the arrows 4—4.
FIG. 5 is a perspective view of the collapsed container preparatory to opening into square form.
FIG. 6 is a perspective view of an intermediate stage of opening the collapsed container of FIG. 5 showing the formation of opposed outwardly extending two ply triangular integral sections of the lower margins of one pair of opposed walls.
FIG. 7 is a perspective view which illustrates the structure of FIG. 6 opened into square form with the fin joint extending horizontally from the outwardly extending apices of the triangular sections.
FIG. 8 is a cross sectional view taken in the direction of the arrows 8—8 of FIG. 7.

FIG. 1 illustrates the rectangular blank A from which the container is formed. The blank is scored horizontally at 20 to define the inner fold line of a fin joint sealing strip 21. Vertical scores 22 define the side edges of opposed side wall panels 23, the vertical side edges of the intermediate wall panels 24 and also the vertical side edges of half width wall panels 25 and 26. The half width panel 26 has an integral sealing flap 27 on its outer vertical side edge defined by score 28. The intermediate wall panels 24 are divided by vertical score 29.

Horizontal score 30 extends across the lower margins of the side wall panels at a distance from the lower horizontal score 20 equal to one half the width of wall panels 23 and equal in width to half width wall panels 25 and 26, defining a body portion and a closure portion, the closure including integral sections. Half width wall panel 25 is score diagonally at 31 from the juncture of of score 22 with the horizontal score 30 to the juncture of its outer end edges with score line 20, while half width panel 26 is scored diagonally at 32 from the juncture of vertical score 22 with horizontal score 30 to the juncture of longitudinal score 20 with vertical score 28. These diagonal scores define foldable triangular bellows fold sections 33 and 34 on the lower margins of half wall panels 25 and 26 respectively. The lower margins of the intermediate panels 24 are scored diagonally at 35 and 36 from junctures of score 22 with score 30 to the juncture of score 29 and horizontal score 20, to form bellows fold triangular sections 37 and 38.

The container may be assembled in any convenient way. A method of assembly of a preferred embodiment of the invention is to fold the half width wall panel 25 over half width wall panel 26 about the score 29 as shown in FIG. 2, and glue is applied to the sealing flap 27. In this collapsed position of the walls, the lower portions of the wall panels 21 forming the fin joint fall into juxtaposed relation. The sealing flap 27 is then applied to half panel 25, connecting the wall panels together and the juxtaposed lower end margins 21 of the panels enclosed by tape 40 or other suitable means. Small end portions 41 of the tape preferably project beyond the juxtaposed end margins of the walls as clearly illustrated in FIG. 3. The ends 41 of the tape become automatically secured to each other, as additional security to the joint against leakage.

The cross sectional view FIG. 4 taken in the direction of the arrows 4—4 of FIG. 3 illustrates the juxtaposed end margins 21 of the wall panels enclosed by tape 40, forming a fin joint.

The container thus preassembled and in collapsed form as illustrated in FIG. 5 is suitable for storage and shipment to the point of use. The initial procedure in opening the container into square form, as shown in the perspective drawing FIG. 6, is to separate the opposed wall panels 23, whereby the other opposed panels comprising the half width panels 25 and 26, secured together by the sealing strip 27, forming the manufacturer's joint, and the panels 24 are gradually forced inwardly about the manufacturer's joint, and the vertical score 29 separating half panels 24 to form the substantially planar opposed full width panels shown in FIG. 7. As this inwardly folding of the half width panels progresses, the triangular portions 33 and 34 of the half width panels 25 and 26 respectively and the opposed triangular sections 37 and 38 of panels 24 become automatically extended outwardly, forming two ply triangular sections, as shown in FIG. 7, extending from the ends of the wall panels in right angular relation thereto. Concomitantly, portions 39 integral with panels 23 automatically fold right angularly inwardly to form the inner bottom of the closure.

At this stage of the assembly, the fin joint 21 is in upright right angular relation across the inner bottom formed of sections 39 and extends outwardly to the apices of the folded triangular sections. This position of the fin joint and the folded marginal sections of the walls is illustrated in the enlarged cross sectional view, FIG. 8 taken in the direction of arrows 8—8 of FIG. 7.

Figure 11:
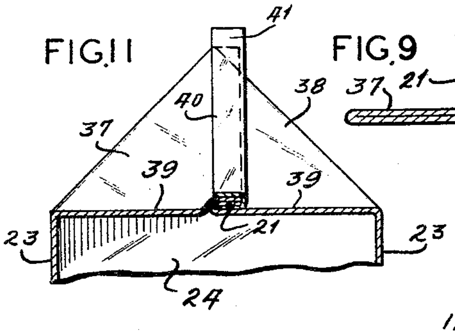
FIG. 11 is a cross sectional view of the bottom portion of the container of FIG. 10 taken in the direction of the arrows 11—11.
Figure 9:
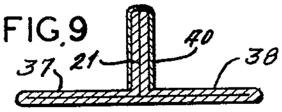
FIG. 9 is a sectional view of FIG. 8 taken in the direction of the arrows 9—9 of FIG. 8.
Figure 10:
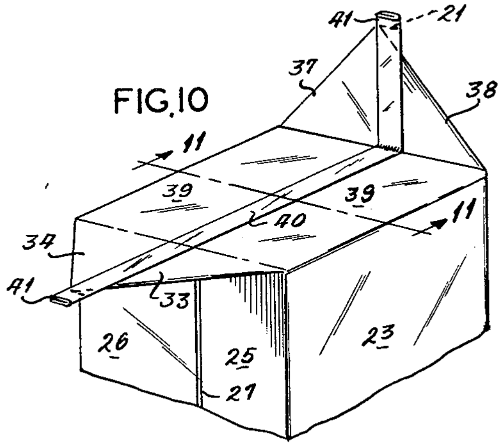
FIG. 10 is a perspective view of the bottom closure showing one of the triangular sections of FIG. 9 in process of folding over the inner bottom.

The taped fin joint 21 shown extending right angularly upward in FIG. 9 is next folded flatwise over the inner bottom 39—39 and the outwardly extending triangular sections and the latter folded inwardly over the fin joint as illustrated in the perspective view FIG. 10, and sectional view FIG. 11, bringing the ends of the fin joint into substantially abutting relation. The ends of the fin joint are then secured together by a staple or other suitable means to the subjacent portion thereof, or to both the ends and the subjacent portion of the fin joint and including the closure portion 39—39, completing the assembly of the bottom closure as illustrated in FIG. 12.

Figure 12:
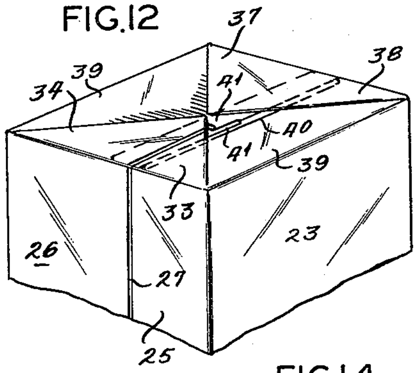
FIG. 12 is a perspective view of the assembled bottom closure.
Figures 13, 14, 15:
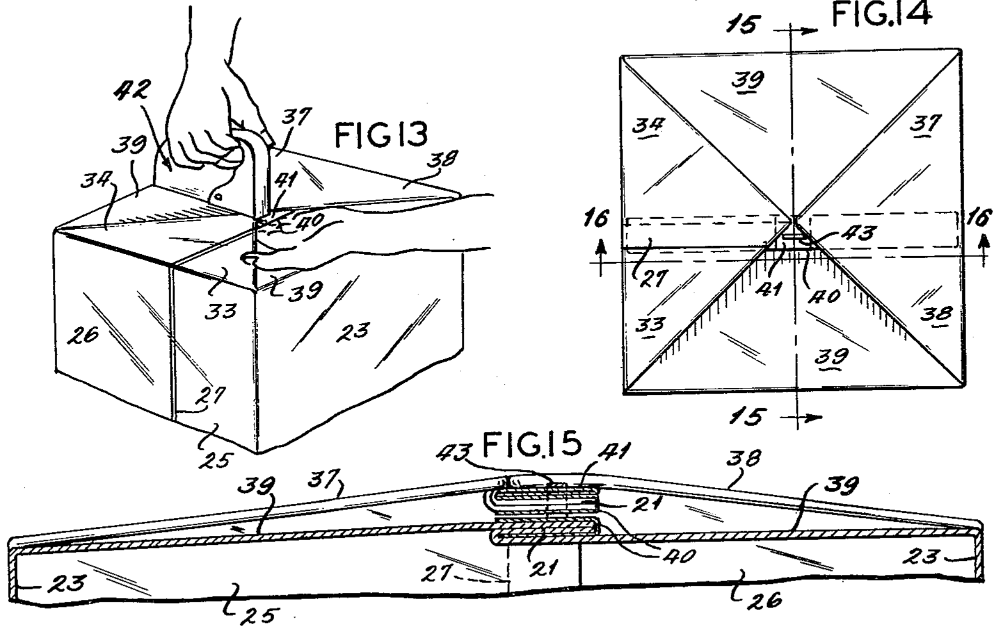
FIG. 13 is a perspective view of the bottom closure showing the stapling of the ends of the fin joint to the subjacent portions thereof.
FIG. 14 is a plan view of the bottom closure showing the end margins of the fin joint secured to the subjacent portions thereof.
FIG. 15 is a sectional view of the bottom closure of FIG. 14 taken in the direction of the arrows 15—15.

The fully assembled closure is shown in the perspective view FIG. 12 and in the plan view FIG. 14.

The perspective view FIG. 13, illustrates the method of applying a stapling device 42, to secure the end margins of the fin joint to each other and also to the subjacent intermediate portion of the fin joint, if desired, while the plan view FIG. 14 shows the staple 43 in place.

An enlarged sectional view of the fully assembled bottom closure taken in the direction of arrows 15—15 of FIG. 14 is shown in FIG. 15. Here is illustrated the fin joint 21 enclosed in tape 40 in section detail and showing the staple 43 securing the opposed end margins of the fin joint together, and the apices of the triangular sections 37 and 38 in position over the inner bottom.

Figure 16:
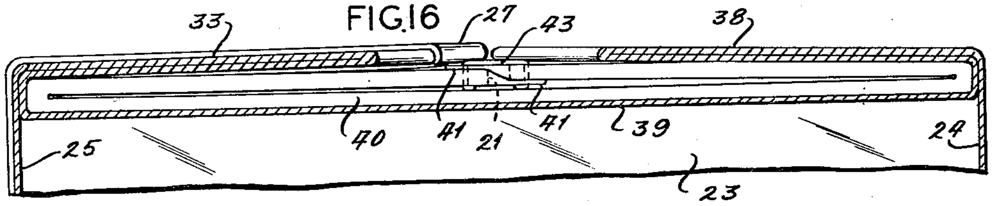
FIG. 16 is a sectional view of the bottom closure of FIG. 14 taken in the direction of the arrows 16—16.

The enlarged sectional view FIG. 16, taken in the direction of the arrows 16—16 of FIG. 14 illustrates the fin joint overlying the inner bottom 39 with the end margins thereof secured together. The drawing also shows the triangular sections of the closure overlying the fin joint with their apices in abutting relation in a preferred embodiment.

Figure 17:
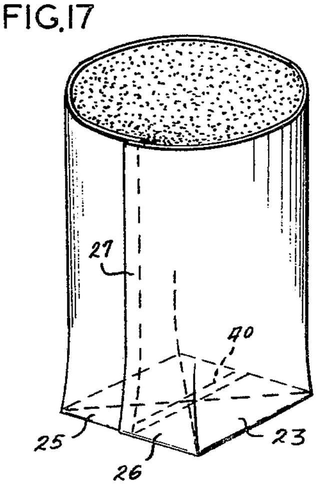
FIG. 17 is a perspective view of the container illustrating the substantially circular form thereof from a short distance above the square bottom closure to the top when filled with asphalt.

In the thus assembled position of the container, the walls are in right angular relation to each other forming a rectangular, preferably square, structure open at the top, ready for filling with asphalt or other bituminous materials in molten form. The square form of the lower margin of the container walls from three to four inches above the square bottom closure becomes substantially circular upwardly to the top of the container as illustrated in the perspective view FIG. 17 when filled with the molten asphalt. This shape of the container permits the package to be rolled after the asphalt solidifies yet, unintentional rolling is restrained by the rectangular shape of the lower margins of the package.

Figure 18:
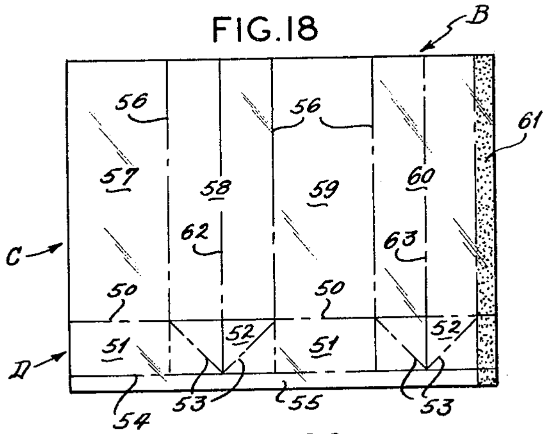
FIG. 18 is a plan view of a modified form of a blank for the container scored transversely to define a body portion and a closure portion, including integral sections, a vertical sealing flap and a bottom marginal fin joint strip.

A modified form of the blank of FIG. 1 is illustrated in FIG. 18 at B. The blank is scored horizontally at 50 to define a body portion C and a closure portion D. The closure portion comprises rectangular shaped portions 51 and integral sections 52. Diagonal scores 53 provide fold lines of the integral sections for forming outward extending bellows folds of these sections.

The free margins of the closure portion D are scored horizontally at 54 to define the inner fold line of the sealing strip 55 extending entirely across the margins of the closure portion and forming a fin joint.

Vertical scores 56 define wall panels 57, 58, 59 and 60 of the body portion, score 56 also defining the fold line of the vertical securing strip 61. The vertical scores 62 and 63 define fold lines along the median width of wall panels 58 and 60. The vertical scores 56 continue across the closure portion D to define rectangular portions 51 thereof and integral bellows fold sections 52.

Figure 19:
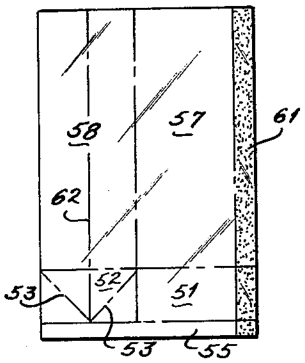
FIG. 19 is a plan view of the modified blank of FIG. 18 folded on itself preparatory to attaching the vertical sealing strip to the free side edge of the remote body wall panel.

The blank B of FIG. 18 is folded over on itself as shown in FIG. 19 so that the wall panel 57 is in flatwise position over panel 60 and panel 58 flatwise over panel 59 with the vertical closure flap 61 in position to secure the folded blank together.

The sealing strip 55 forming the fin joint, in the course of folding the blank, becomes folded on itself and the rectangular closure section 51 becomes juxtaposed with the integral bellows fold sections 52.

The flat blank is secured together in this folded position by applying glue to the vertical strip 61 and folding it over both wall panel 57 and rectangular shaped portions 51 of the closure portion. The essential difference between this flat blank and the flat blank of FIG. 5 resides in the position of the manufacturer's joint formed by the sealing strip 61. This joint is positioned on the side edges of wall panels 57 and 60 whereby the joint is at a corner of the opened up container. This modified form of the invention may be erected and the closure portion D assembled in the same manner as hereinbefore described for the blank illustrated in FIG. 5 wherein the manufacturer's joint is positioned along juxtaposed edges of half panels 25 and 26.

Figure 20:
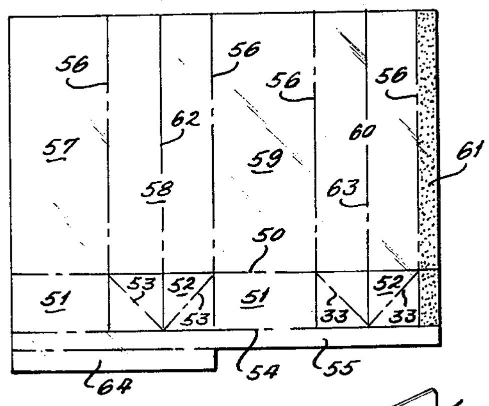
FIG. 20 is a modified plan view of the blank of FIG. 18 illustrating an outer half length extension to the fin joint strip.
Figure 21:
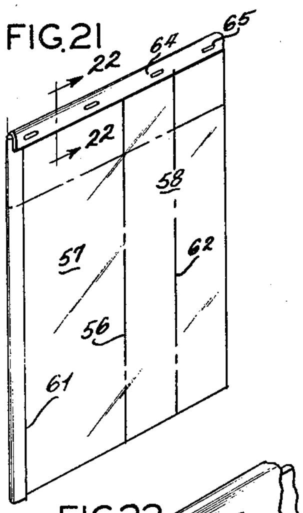
FIG. 21 is a perspective illustration of the fin joint with the half length extension of the fin joint folded thereover.

A still further modification of the blank forming the container is shown in FIG. 20. This blank provides a half length extension 64 integral with the sealing strip 55 which in the flat folded position of the blank as shown in FIG. 21, is folded over the fin joint sealing strip 55 and secured thereto by staples 65. A perspective sectional view FIG. 22 taken in the direction of the arrows 22 of FIG. 21 shows the fin joint in greater detail.

Figure 23:
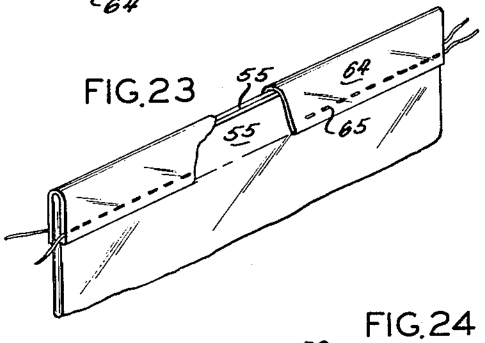
FIG. 23 illustrates the fin point of FIG. 21 in perspective showing the extension of the fin joint strip sewed to the joint and a portion broken away to illustrate the inner construction of the joint.

The construction of the fin joint is shown more clearly in the enlarged perspective view of FIG. 23 wherein a portion of the joint is cut away to disclose the folded over portion of the sealing strip 55 enclosed by the half length extension 64. In this enlarged view the extension is shown sewed through the fin joint and sealing strip at 65.

This modified folded over flat blank, FIG. 21 may be erected in the same manner as described for the flat blank of FIG. 5. The folded flat blank may carry the manufacturer's joint at the corner of the container as described in connection with the flat blank of FIG. 19, or wherein the manufacturer's joint is positioned along the median width of one of the walls of the panel.

The extension 64 of the fin joint sealing strip 55 forms a leakproof joint of the closure portion D by glue, staples or sewing.

It has been found that where the fin joint sealing strip is enclosed by tape as shown in FIGS. 3, 4 and 5, staples through the tape and joint may be used to advantage.

Figure 22:
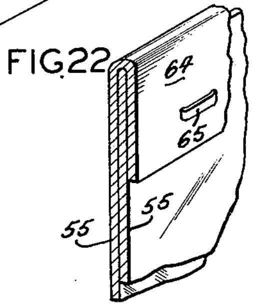
FIG. 22 is a sectional perspective view of the fin joint taken in the direction of the arrows 22—22 of FIG. 21.
Figure 24:
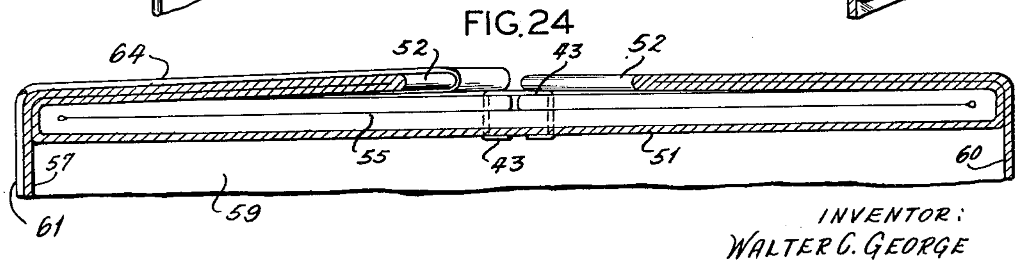
FIG. 24 is a sectional view of the bottom construction of the container similar to FIG. 16 showing the securing staple extending through the fin joint and the inner bottom of the container.

The joint enclosed by the extension 64, FIGS. 21, 22 and 23, affords additional security against leakage; this joint does not require tape and may be glued, sewed or stapled.

It has also been found that the staple, 43, securing the ends of the fin joint together as illustrated in FIGS. 13, 14 and 15, may be extended to advantage through the rectangular parts 39 of the closure portion to provide additional security to the closure portion.

In any of the forms of the invention described, the flat blank is preferably coated with a release coating to provide clean stripping of the container from the asphalt or the like at the point of use, or it may be impregnated or coated with other compositions to provide desired properties thereto.

It is to be understood that the embodiments herein described are illustrative and not restrictive and it is also to be understood that the invention may be susceptible of embodiments in other modified forms and that all such modifications which are similar or equivalent hereto come equally within the scope of the claim next appearing.

I claim:

A paperboard bag-like container being collapsible to substantially flat condition for shipping and when erected having an elongated upper body portion and a lower portion of polygonal formation, the container having leakproof closure means at the polygonal end portion, the closure means at the bottom of the container comprising substantially rectangularly shaped panels and triangularly shaped panels hinged respectively to the opposed walls of the container and being infolded and with the triangular panels infolded over the rectangular panels and having their apices in substantial alignment and close to each other, the end closure means also including a sealed fin joint which is comprised of a relatively narrow marginal lower portion of the container body, the fin joint being folded and disposed flatwise and in contact with an adjacent portion of one of the rectangular panels and this joint having respective end portions thereof extending slightly beyond each triangularly shaped infolded panel and with inner surfaces of the fin joint of each triangular panel being in contact with an adjacent portion of the fin joint in contact with the said one rectangular panel, the portions of the fin joint which extend beyond the triangular panels being positioned closely adjacent the apices of the infolded triangular panels and with the extreme end edges of the fin joints of the triangular panels in adjacent relationship, a subjacent portion of the fin joint on the said one rectangular panel beneath the said abutting end of the fin joint providing a space therebetween and the adjacent part of said one panel for placing therein the anvil portion of a stapler, and a staple extending over and through the projecting part of the fin joint from the triangular panels and extending through that portion of the fin joint immediately beneath the same to permanently secure the rectangular and triangular panels in their closed condition and thus provide the leak-proof bottom of the container.

References Cited in the file of this patent

UNITED STATES PATENTS

| | | |
|---|---|---|
| 1,920,320 | Rosmait | Aug. 1, 1933 |
| 2,271,455 | Finn | Jan. 27, 1942 |
| 2,374,793 | Waters | May 1, 1945 |
| 2,395,663 | Howard | Feb. 26, 1946 |
| 2,656,093 | Smith | Oct. 20, 1953 |
| 2,670,127 | Gleason et al. | Feb. 23, 1954 |
| 2,853,225 | Bauer | Sept. 23, 1958 |